US009967417B2

(12) United States Patent
Tomi

(10) Patent No.: US 9,967,417 B2
(45) Date of Patent: May 8, 2018

(54) MANAGING APPARATUS POWER STATES

(71) Applicant: CANON KABUSHIKI KAISHA, Tokyo (JP)

(72) Inventor: Hideyasu Tomi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 14/995,749

(22) Filed: Jan. 14, 2016

(65) Prior Publication Data

US 2016/0212289 A1    Jul. 21, 2016

(30) Foreign Application Priority Data

Jan. 21, 2015  (JP) ................................ 2015-009795
Dec. 15, 2015  (JP) ................................ 2015-244396

(51) Int. Cl.
 *G06K 15/00* (2006.01)
 *H04N 1/00* (2006.01)
(52) U.S. Cl.
 CPC . *H04N 1/00896* (2013.01); *H04N 2201/0094* (2013.01)
(58) Field of Classification Search
 CPC .......... H04N 1/00896; G06F 1/00; G06F 1/32
 See application file for complete search history.

(56) References Cited

U.S. PATENT DOCUMENTS

| 8,397,033 | B2 | 3/2013 | Tomi | |
| 2007/0183107 | A1* | 8/2007 | Okada | G03G 15/5004 |
| | | | | 361/62 |
| 2011/0040992 | A1* | 2/2011 | Mizunashi | H04L 12/10 |
| | | | | 713/310 |
| 2011/0222417 | A1* | 9/2011 | Watanabe | G06F 1/3209 |
| | | | | 370/252 |
| 2012/0239953 | A1* | 9/2012 | Kuroko | G06K 15/4055 |
| | | | | 713/320 |

(Continued)

FOREIGN PATENT DOCUMENTS

| CN | 101212539 A | 7/2008 |
| CN | 102263874 A | 11/2011 |

(Continued)

OTHER PUBLICATIONS

Search/Examination Report dated Jul. 13, 2016 in Application No. GB1601119.9.

(Continued)

*Primary Examiner* — Henok A Shiferaw
(74) *Attorney, Agent, or Firm* — Fitzpatrick, Cella, Harper & Scinto

(57) ABSTRACT

A sub-system determines, based on an input instruction to transition a power state of an information processing apparatus to a power saving state, a power state from a plurality of power states in which the sub-system can operate, and notifies the main system of a recovery period that corresponds to the determined power state and that the sub-system requires to recover from the determined power state. The main system determines, based on the recovery period notified from the sub-system, a power state that the main system transitions to from a plurality of power states in which the main system can operate.

17 Claims, 13 Drawing Sheets

(56) References Cited

U.S. PATENT DOCUMENTS

| | | | |
|---|---|---|---|
| 2012/0257247 A1* | 10/2012 | Yamasaki | G06K 15/4055 358/1.15 |
| 2013/0046967 A1* | 2/2013 | Fullerton | H03K 3/0315 713/100 |
| 2013/0179644 A1 | 7/2013 | Tomi | |
| 2013/0198550 A1* | 8/2013 | Yoshida | G06F 1/3287 713/324 |
| 2014/0013139 A1* | 1/2014 | Kimura | G06F 1/3234 713/323 |
| 2014/0241745 A1 | 8/2014 | Imaoka | |
| 2014/0281622 A1* | 9/2014 | Wagh | G06F 1/3206 713/323 |

FOREIGN PATENT DOCUMENTS

| | | |
|---|---|---|
| CN | 103731582 A | 4/2014 |
| CN | 103777910 A | 5/2014 |
| JP | 2001-142588 A | 5/2001 |
| JP | 2007-098811 A | 4/2007 |
| JP | 2008-204209 A | 9/2008 |
| JP | 2014-182801 A | 9/2014 |

OTHER PUBLICATIONS

Chinese Office Action dated Jan. 24, 2018 in Chinese Application No. 201610023553.8.

* cited by examiner

FIG. 5

IMAGE FORMING APPARATUS ~100

| | MAIN SYSTEM ROM | MAIN SYSTEM | MAIN SYSTEM HDD | MAIN SYSTEM DRAM | SUB-SYSTEM 102 | SUB-SYSTEM 103 | POWER SUPPLY CONTROL UNIT |
|---|---|---|---|---|---|---|---|
| POWER SAVING STATE | OFF | ON | OFF | OFF | ON | ON | ON |

SUB-SYSTEM ~102

| | CPU 301 | ROM IF UNIT 302 | DRAM IF UNIT 303 | MAIN SYSTEM IF UNIT 304 | NETWORK IF UNIT 305 | USB IF UNIT 306 | INTERNAL POWER SUPPLY CONTROLL UNIT 307 | SUB-SYSTEM ROM 105 | SUB-SYSTEM DRAM 107 | RECOVERY PERIOD |
|---|---|---|---|---|---|---|---|---|---|---|
| NW RESPONSE | ON | OFF | ON | OFF | ON | OFF | ON | OFF | ON | 50msec |
| USB RESPONSE | ON | OFF | ON | OFF | OFF | ON | ON | OFF | ON | 50msec |
| NW & USB RESPONSE | ON | OFF | ON | OFF | ON | ON | ON | OFF | ON | 25msec |
| OPERATION STOP | ON | OFF | ON | OFF | OFF | OFF | OFF | OFF | OFF | 200msec |

SUB-SYSTEM ~103

| | CPU 401 | ROM IF UNIT 402 | DRAM IF UNIT 403 | MAIN SYSTEM IF UNIT 404 | IMAGE PROCESSING UNIT 405 | SETTING INFORMATION STORAGE UNIT 406 | PRINTER I/F UNIT 407 | SCANNER I/F UNIT 408 | FAX I/F UNIT 409 | INTERNAL POWER SUPPLY CONTROL UNIT 410 | SUB-SYSTEM ROM 112 | SUB-SYSTEM DRAM 113 | RECOVERY PERIOD |
|---|---|---|---|---|---|---|---|---|---|---|---|---|---|
| SETTING INFORMATION RETENTION | ON | OFF | ON | OFF | OFF | ON | OFF | OFF | OFF | ON | OFF | ON | 50msec |
| FAX RESPONSE | ON | OFF | ON | OFF | OFF | OFF | OFF | OFF | ON | ON | OFF | ON | 350msec |
| SETTING INFORMATION RETENTION & FAX RESPONSE | ON | OFF | ON | OFF | OFF | ON | OFF | OFF | ON | ON | OFF | ON | 25msec |
| OPERATION STOP | ON | OFF | ON | OFF | OFF | OFF | OFF | OFF | OFF | OFF | OFF | OFF | 500msec |

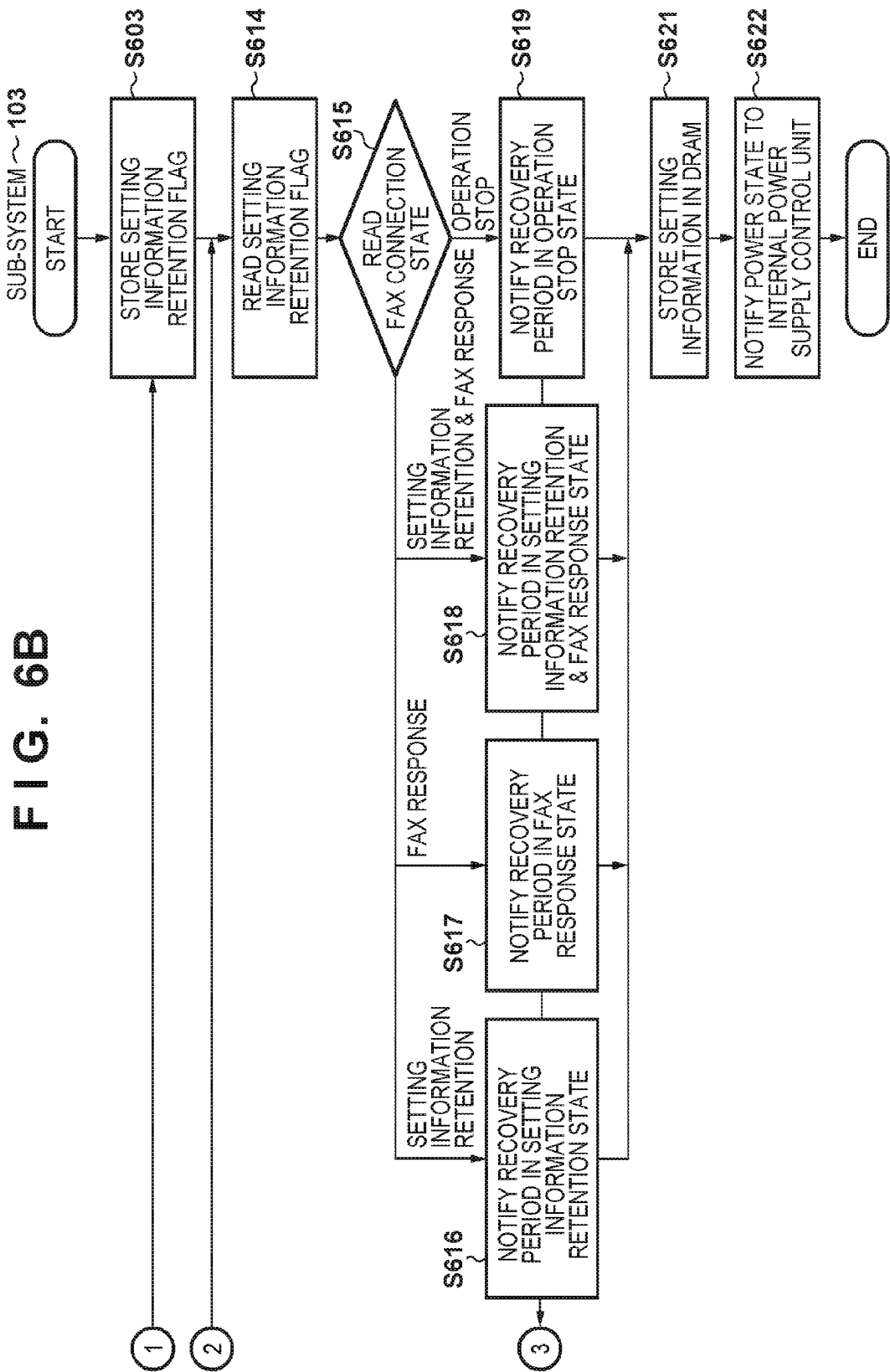

FIG. 10

SUB-SYSTEM 102

| | CPU 301 | ROM IF UNIT 302 | DRAM IF UNIT 303 | MAIN SYSTEM IF UNIT 304 | NETWORK IF UNIT 305 | USB IF UNIT 306 | INTERNAL POWER SUPPLY CONTROL UNIT 307 | SUB-SYSTEM ROM 105 | SUB-SYSTEM DRAM 107 | RECOVERY PERIOD |
|---|---|---|---|---|---|---|---|---|---|---|
| ALL POWER SUPPLY ON | ON | ON | ON | ON | ON | ON | ON | ON | ON | 5msec |
| NW RESPONSE | ON | OFF | ON | OFF | ON | OFF | ON | OFF | ON | 50msec |
| OPERATION STOP | ON | OFF | ON | OFF | OFF | OFF | OFF | OFF | OFF | 200msec |

MANAGING APPARATUS POWER STATES

BACKGROUND OF THE INVENTION

Field of the Invention

The present invention relates to a technique of shortening a period to transition from a power saving state to an operational state in an apparatus having a main system and a sub-system.

Description of the Related Art

With an objective of shortening a transition period (hereinafter, referred to as a recovery period) when causing an apparatus, which is divided into a main system and a sub-system, to transition from a power saving state to an operational state, there is a technique of notifying a recovery period of the sub-system to the main system (Japanese Patent Laid-Open No. 2014-182801). According to Japanese Patent Laid-Open No. 2014-182801, because the main system can start accessing the sub-system by waiting for just the notified recovery period, it is possible to shorten the recovery period.

However, in the technique recited in Japanese Patent Laid-Open No. 2014-182801, the sub-system only notifies a single recovery period. However, if the sub-system has multiple functions, a plurality of power states may be held in the power saving state, and recovery periods in each of the power states may be different. In other words, if it only possible to notify the one longest recovery period as in Japanese Patent Laid-Open No. 2014-182801, even if the sub-system is in a power state having a shorter recovery period in the power saving state, it is not possible to access the sub-system without waiting for the longer time period. With this arrangement, there is a problem that the recovery to the operational state of the apparatus is slower than it needs to be.

SUMMARY OF THE INVENTION

The present invention was conceived in view of these kinds of problems, and provides a technique of shortening a time period required for an apparatus having a main system and a sub-system to recover to an operational state from a power saving state.

According to the first aspect of the present invention, there is provided an information processing apparatus comprising a main system and a sub-system communicably connected to the main system, wherein: the sub-system is arranged to determine, based on an input instruction to transition a power state of the information processing apparatus to a power saving state, a power state from a plurality of power states in which the sub-system can operate, and to notify the main system of a recovery period that corresponds to the determined power state and that the sub-system requires to recover from the determined power state, wherein the main system is arranged to determine, based on the recovery period notified from the sub-system, a power state that the main system transitions to from a plurality of power states in which the main system can operate.

According to the second aspect of the present invention, there is provided a method of controlling an information processing apparatus comprising a main system and a sub-system communicably connected to the main system, wherein: the sub-system determines, based on an input instruction to transition a power state of the information processing apparatus to a power saving state, a power state from a plurality of power states in which the sub-system can operate, and notifies the main system of a recovery period that corresponds to the determined power state and that the sub-system requires to recover from the determined power state, wherein the main system determines, based on the recovery period notified from the sub-system, a power state that the main system transitions to from a plurality of power states in which the main system can operate.

Further features of the present invention will become apparent from the following description of exemplary embodiments (with reference to the attached drawings). Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 5 is a view for illustrating power supply states and recovery periods.

FIGS. 6A and 6B are flowcharts of processing to transition from an operational state to a power saving state.

FIG. 10 is a view for illustrating power states and recovery periods.

DESCRIPTION OF THE EMBODIMENTS

Embodiments of the present invention will be described hereinafter in detail, with reference to the accompanying drawings. Note that embodiments described below merely illustrate examples of specifically implementing the present invention, and are only specific embodiments of a configuration defined in the scope of the claims.

First Embodiment

Figure 1:
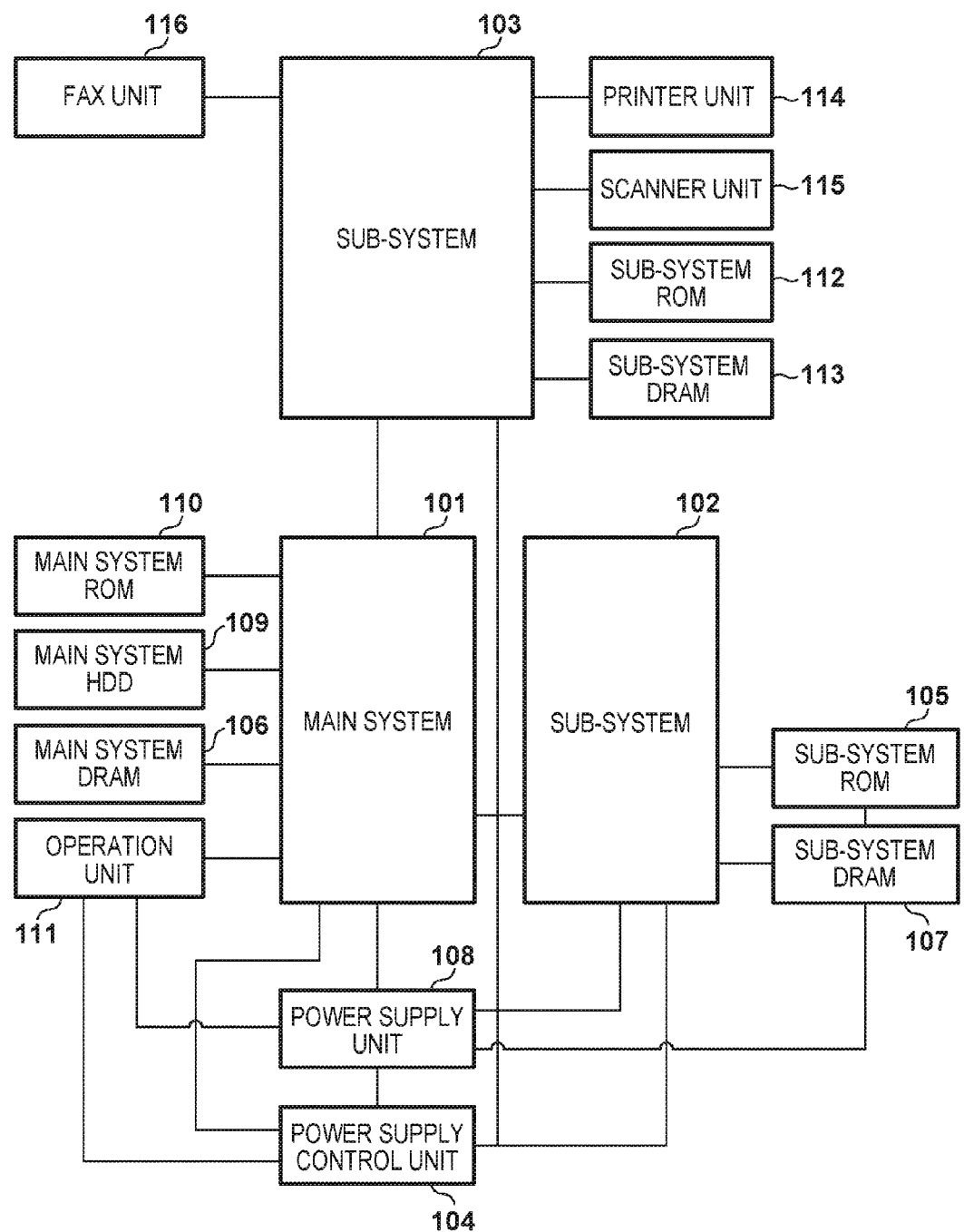
FIG. 1 is a block diagram for illustrating an example configuration of an image forming apparatus 100.

In the present embodiment, explanation is given by taking an information processing apparatus applied to an image forming apparatus as an example. Firstly, a block diagram of FIG. 1 is used to explain an example configuration of an image forming apparatus according to the present embodiment. In FIG. 1, the image forming apparatus 100 is assumed to be an MFP (Multi Function Printer) having a copy function, a print function, a FAX function, or the like. However, application may be made to any device if it is an information processing apparatus comprising a main system and a sub-system communicably connected to the main system, and it has the following configuration.

The sub-system determines, based on an input instruction to transition a power state of the information processing apparatus to a power saving state, a power state from a plurality of power states in which the sub-system can operate, and notifies the main system of a recovery period that corresponds to the determined power state and that the sub-system requires to recover from the determined power state.

The main system determines, based on the recovery period notified from the sub-system, a power state that the main system transitions to from a plurality of power states in which the main system can operate.

A main system 101 is configured by a CPU (Central Processing Unit) for performing operation control of the image forming apparatus 100 on the whole. For example, the main system 101 performs control for causing the power state of the image forming apparatus 100 to transition to various states. The operation of the main system 101 to cause the power state to transition is explained later. In addition, detail of the main system 101 is explained later using FIG. 2.

A sub-system 102 is an SoC (System On Chip) on which a CPU or a network IF circuit or the like is installed. The sub-system 102 has a dependency relationship with respect to the main system 101, and the main system 101 performs operation control or various setting of the sub-system 102. In addition, detail of the sub-system 102 is explained later using FIG. 3.

A sub-system 103 is an SoC on which a CPU, an image processing circuit, or the like is installed. The sub-system 103 has a dependency relationship with respect to the main system 101, and the main system 101 performs operation control or various setting of the sub-system 103. Detail of the sub-system 103 is explained later using FIG. 4.

A main system ROM 110 is a rewritable flash ROM in which data or computer programs that the main system 101 (the CPU in the main system 101) uses to execute various processing is stored. When a power supply is input, the main system 101 first uses computer programs or data stored in the main system ROM 110 to execute processing.

A main system HDD (Hard Disk Drive) 109 is an example of a large capacity information storage device, and data, various application programs, an OS (Operating System) for causing operation of the main system 101 or the sub-systems 102 and 103, or the like are stored. Computer programs or data saved/stored in the main system HDD 109 or the main system ROM 110 is appropriately loaded into a main system DRAM 106 in accordance with control by the main system 101, and becomes a target of processing by the main system 101.

The main system DRAM 106 is a DRAM (Dynamic Random Access Memory) in which the OS or computer programs or data of the main system 101 is loaded. Using computer programs or data stored in the main system DRAM 106 to execute processing, the main system 101 executes operation control of the image forming apparatus 100 on the whole, and each process later-described as something that the main system 101 performs.

An operation unit 111 is a device such as a touch panel that arranges both a display function and an operation function, and functions as a user interface of the main system 101. The operation unit 111, for example, may be comprised by combining a liquid crystal display (a touch panel screen) and hard keys. The operation unit 111 performs reception of an operation instruction from a user, and display of an operation result.

A sub-system ROM 105 is a rewritable flash ROM in which data or computer programs that the sub-system 102 (the CPU in the sub-system 102) uses to execute various processing is stored. Computer programs or data stored in the sub-system ROM 105 are appropriately loaded into a sub-system DRAM 107 in accordance with control by the sub-system 102, and become a target of processing by the sub-system 102.

The sub-system DRAM 107 is a DRAM into which an OS or a computer program or data of the sub-system 102 is loaded. Using computer programs or data stored in the sub-system DRAM 107 to execute processing, the sub-system 102 executes each process later-described as something that the sub-system 102 performs.

A power supply control unit 104 handles power supply control of the image forming apparatus 100, and is configured by a CPLD (Complex Programmable Logic Device). By performing a control instruction for power ON or power OFF to a power supply unit 108, the power supply control unit 104 controls power states such as a power saving state of the image forming apparatus 100. In addition, the power supply control unit 104 can also make a control instruction towards a power supply control unit incorporated in the sub-system 102 or the sub-system 103. In addition, it manages a cause of a transition of the power state in the image forming apparatus 100, and upon receiving a transition cause, outputs an interrupt to the main system 101.

The power supply unit 108 is configured by a DC/DC converter or the like, and generates a plurality of kinds of power supply necessary for each component of the image forming apparatus 100. In addition, the power supply unit 108 is controlled by the power supply control unit 104, turns ON or OFF the plurality of kinds of power supply, and generates a power supply state (a pattern of ON/OFF of the power supply with respect to each component) in accordance with the power state of the image forming apparatus 100.

A printer unit 114 is a device that records text or an image on a recording medium, such as paper, based on supplied print data, and for example is configured by a laser beam printer or an ink-jet printer.

A scanner unit 115 is a device that reads, as an image, information recorded on a recording medium such as paper, and sends the read image to the sub-system 103.

A FAX unit 116 is something that uses a public line to transmit/receive FAX data. Note that it may not be connected depending on the device configuration of the image forming apparatus 100.

A sub-system ROM 112 is a rewritable flash ROM (Read Only Memory) in which data or computer programs that the sub-system 103 (the CPU in the sub-system 103) uses to execute various processing is stored. Computer programs or data stored in the sub-system ROM 112 are appropriately loaded into a sub-system DRAM 113 in accordance with control by the sub-system 103, and become a target of processing by the sub-system 103.

The sub-system DRAM 113 is a DRAM into which an OS or a computer program or data of the sub-system 103 is loaded. Using computer programs or data stored in the sub-system DRAM 113 to execute processing, the sub-system 103 executes each process later-described as something that the sub-system 103 performs.

Figure 2:
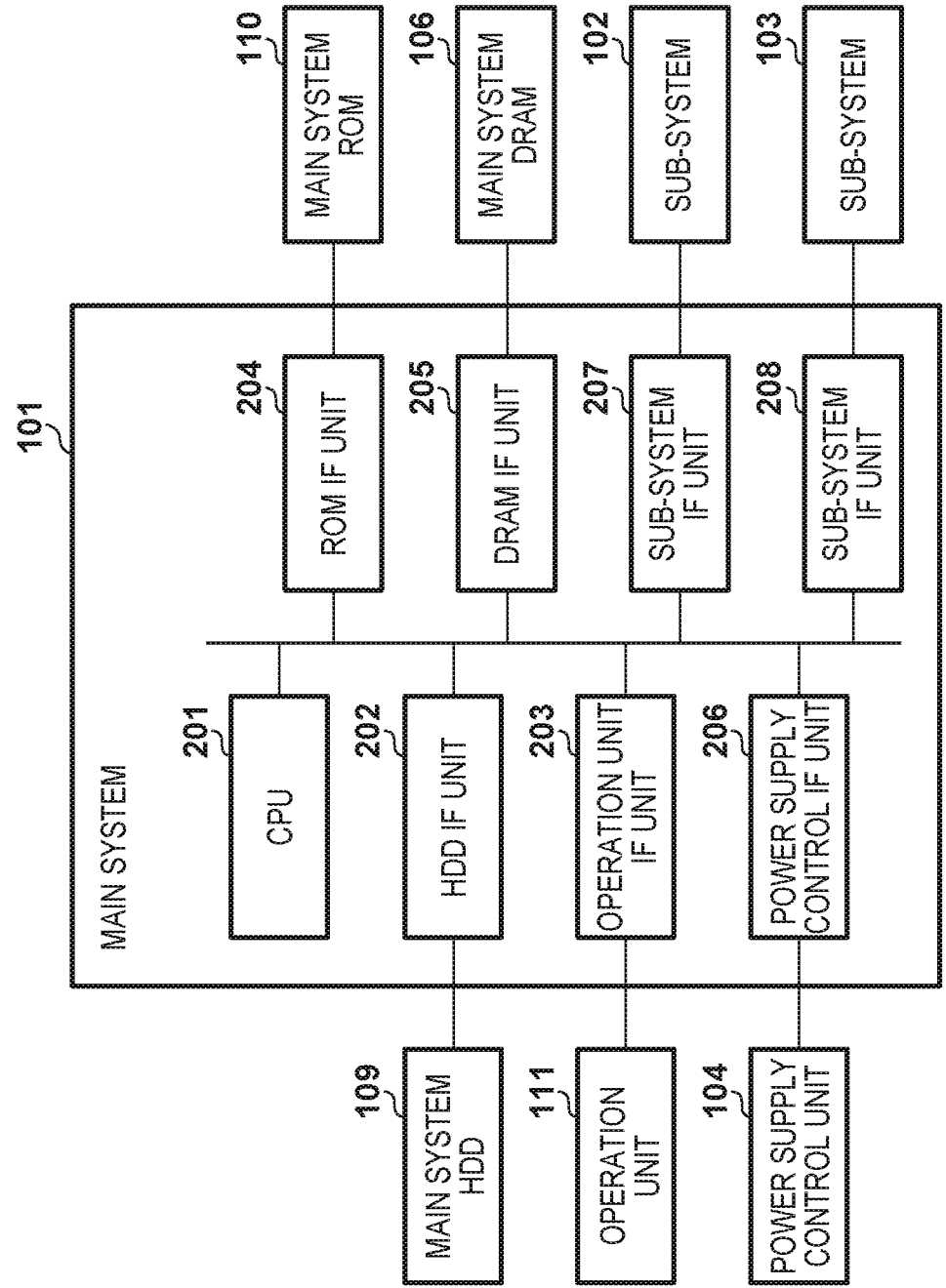
FIG. 2 is a block diagram for illustrating an example configuration of a main system 101.

Next, a block diagram of FIG. 2 is used to explain an example configuration of the main system 101.

A CPU 201 performs control or the like of each I/F (InterFace) unit of the main system 101. Upon activation of a power supply of the image forming apparatus 100, the CPU 201 uses computer programs or data stored in the main system ROM 110 to perform boot processing, and uses an OS or computer programs or data loaded into the main system DRAM 106 to execute processing. With this the CPU 201 executes or controls each process described later as something that the main system 101 performs.

An HDD IF unit 202 is an I/F module for accessing the main system HDD 109.

An operation unit IF unit 203 is an I/F module for performing communication with the operation unit 111 that transmits a GUI (Graphical User Interface) generated by the CPU 201 using data of the GUI stored in the main system HDD 109 to the operation unit 111, and obtains content of user operations on the operation unit 111 from the operation unit 111 and sends it to the CPU 201.

A ROM IF unit 204 is an I/F module for accessing the main system ROM 110.

A DRAM IF unit 205 is an I/F module for accessing the main system DRAM 106.

A power supply control IF unit 206 is an I/F module that notifies a power state of the main system 101 to the power supply control unit 104, and performs communication with the power supply control unit 104 to cause the power state of the image forming apparatus 100 to transition.

A sub-system IF unit 207 is an I/F module for connecting the sub-system 102 to the main system 101. A sub-system IF unit 208 is an I/F module for connecting the sub-system 103 to the main system 101. Specifically, both of the sub-system IF unit 207 and the sub-system IF unit 208 are configured by PCIe (Peripheral Component Interconnect Express), in which a root complex is the main system 101 and end points are the sub-systems 102 and 103.

Figure 3:
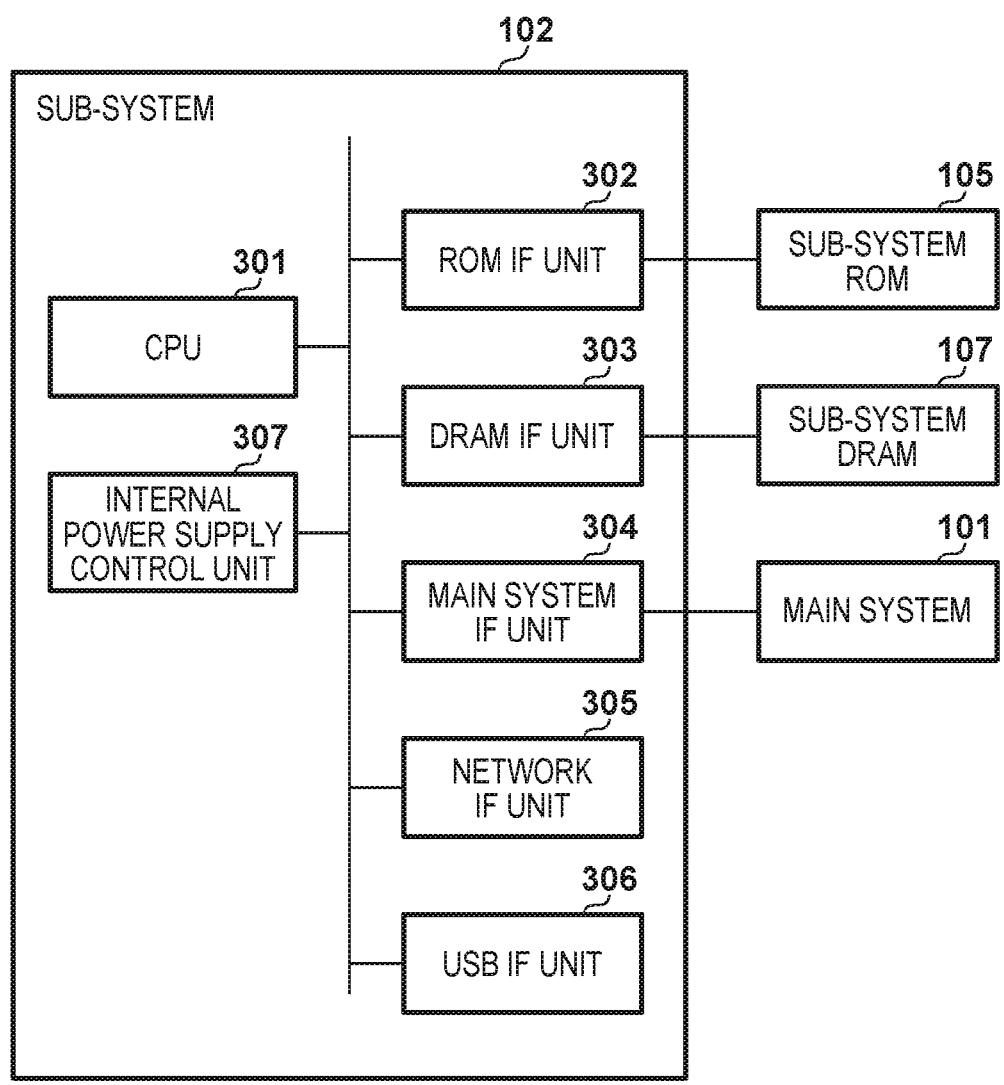
FIG. 3 is a block diagram for illustrating an example configuration of a sub-system 102.

Next, a block diagram of FIG. 3 is used to explain an example configuration of the sub-system 102. In the image forming apparatus 100, the sub-system 102 mainly has a function of controlling communication with an external device.

A CPU 301 performs setting, data processing, or the like of a network IF unit 305 or a USB (Universal Serial Bus) IF unit 306. Upon activation of a power supply of the image forming apparatus 100, the CPU 301 uses computer programs or data stored in the sub-system ROM 105 to perform boot processing, and uses an OS or computer programs or data loaded into the sub-system DRAM 107 to execute processing. With this the CPU 301 executes or controls each process described later as something that the sub-system 102 performs.

A ROM IF unit 302 is an I/F module for accessing the sub-system ROM 105.

A DRAM IF unit 303 is an I/F module for accessing the sub-system DRAM 107. The DRAM IF unit 303 is provided with a register for performing setting or control of the sub-system DRAM 107, and this register can be accessed from both the CPU 301 and the main system 101. For example, if the sub-system DRAM 107 is set to a self-refresh state, by setting the register of the DRAM IF unit 303, it is possible to issue a self-refresh command to the sub-system DRAM 107.

A main system IF unit 304 is an I/F module for connecting the main system 101 to the sub-system 102. Specifically, the main system IF unit 304 is comprised by PCIe, a root complex is the main system 101, and an end point is the sub-system 102.

The network IF unit 305 is, for example, comprised by a LAN card or the like, is connected to a network such as a LAN (not shown), and performs input and output of device information or image data with an external apparatus.

The USB IF unit 306 has a USB Device function, and is an I/F module for performing communication with a USB Host device such as a PC (Personal Computer).

An internal power supply control unit 307 is a module that controls a power supply within the sub-system 102. In accordance with an instruction of the power supply control unit 104 or the CPU 301, the internal power supply control unit 307 performs power supply control such as ON or OFF of a power supply for each component in the sub-system 102.

Figure 4:
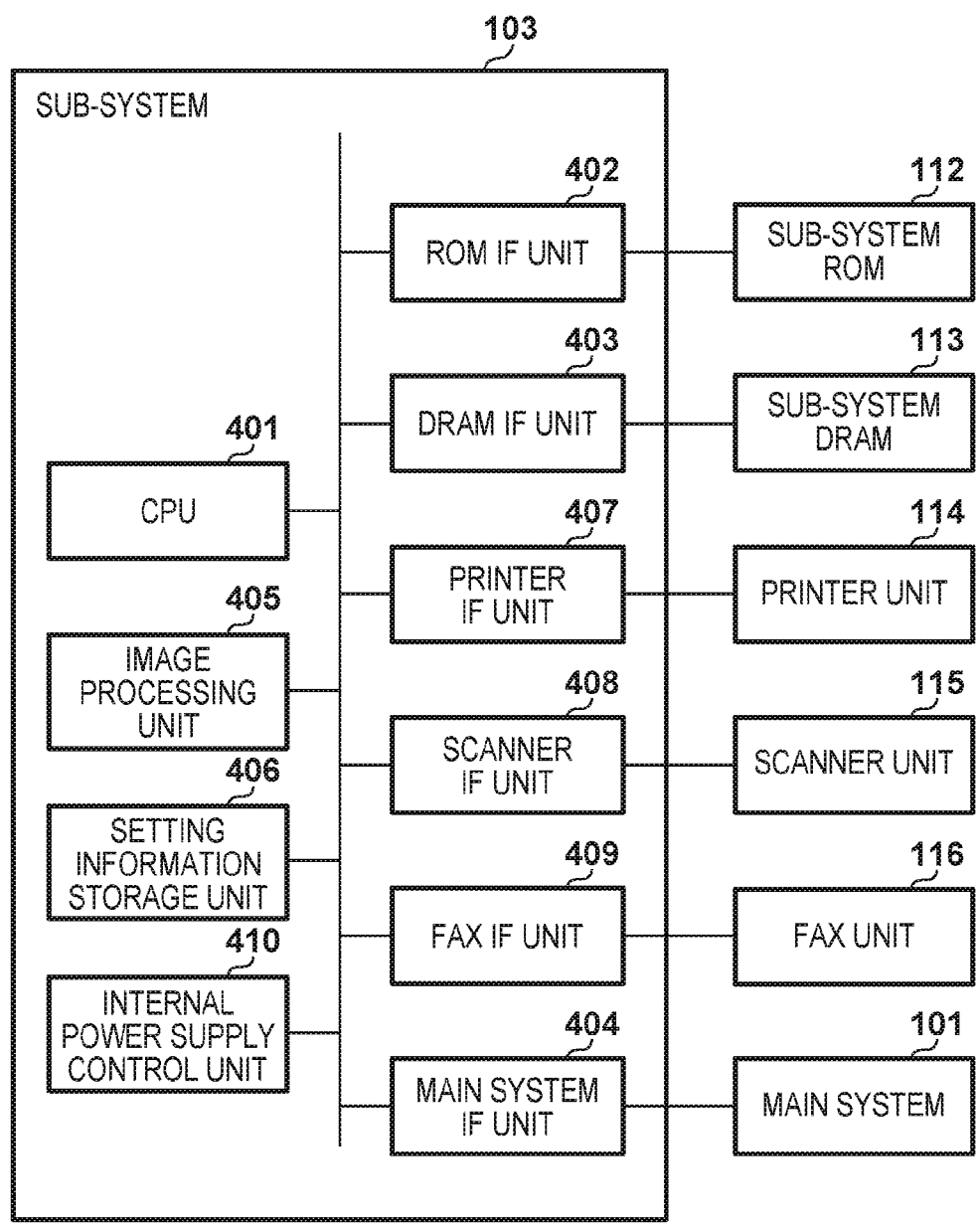
FIG. 4 is a block diagram for illustrating an example configuration of a sub-system 103.

Next, a block diagram of FIG. 4 is used to explain an example configuration of the sub-system 103. In the image forming apparatus 100, the sub-system 103 mainly has a function of image processing or controlling input and output of data with respect to the printer unit 114, the scanner unit 115, or the FAX unit 116.

A CPU 401 performs setting of an image processing unit 405, control of data such as an image, or the like. Upon activation of a power supply of the image forming apparatus 100, the CPU 401 uses computer programs or data stored in the sub-system ROM 112 to perform boot processing, and uses an OS or computer programs or data loaded into the sub-system DRAM 113 to execute processing. With this the CPU 401 executes or controls each process described later as something that the sub-system 103 performs.

A ROM IF unit 402 is an I/F module for accessing the sub-system ROM 112.

A DRAM IF unit 403 is an I/F module for accessing the sub-system DRAM 113. The DRAM IF unit 403 is provided with a register for performing setting or control of the sub-system DRAM 113, and this register can be accessed from both the CPU 401 and the main system 101.

A main system IF unit 404 is an I/F module for connecting the main system 101 to the sub-system 103. Specifically, the main system IF unit 404 is comprised by PCIe, a root complex is the main system 101, and an end point is the sub-system 103.

The image processing unit 405 is a circuit for performing various image processing; it is set and controlled by the CPU 401, and performs various image processing. The image processing unit 405 reads setting information stored in a setting information storage unit 406, and performs various image processing in accordance with the read setting information. For example, it performs color processing, correction processing, or the like with respect to an image read by the scanner unit 115.

The setting information storage unit 406 is a module that stores setting information necessary upon execution of image processing by the image processing unit 405. The setting information storage unit 406 can be read or written to from the main system 101 and as well as from the CPU 401.

A printer IF unit 407 performs communication with the printer unit 114, and has a function that outputs, to the printer unit 114, an image (print data) for which image correction for printing, or the like, has been performed in the image processing unit 405.

A scanner IF unit 408 performs communication with the scanner unit 115, and has a function that transfers an image that the scanner unit 115 has read to the sub-system 103.

A FAX IF unit 409 has a function that transmits/receives FAX data to/from the FAX unit 116.

An internal power source control unit 410 is a module that controls a power supply within the sub-system 103. In accordance with an instruction of the power supply control unit 104 or the CPU 401, the internal power source control unit 410 performs power supply control within the sub-system 103.

Next, explanation is given for power states of the image forming apparatus 100. The image forming apparatus 100 has three power states: an operational state, a standby state, and a power saving state; switching of the power states is, for example, performed by a user using the operation unit 111 and making an instruction, or the main system 101 making an instruction triggered by the main system 101 detecting that a predetermined time or more has elapsed for a state in which there is no input of an operation to the image forming apparatus 100.

Power consumption is largest for the operational state, and becomes smaller in the order of the power saving state and then the standby state. In addition, regarding a period to transition to the operational state, the power saving state is the shortest, and the standby state is the next shortest. From the operational state, it is possible to transition to the standby state and the power saving state. From the standby state it is possible to transition to the operational state. From the power saving state it is possible to transition to the operational state.

The operational state is a state in which a power supply is supplied to the main system 101 and the sub-systems 102 and 103, and is a state in which it is possible to execute processing such as copying or printing. For example, information necessary to execute image processing is set in the setting information storage unit 406. Note that "to transition from the power saving state to the operational state" means all components of the main system 101 and the sub-systems 102 and 103 become operable, and that a state in which processing can be executed is entered.

The standby state is a state in which a power supply is supplied to the main system DRAM 106 and a portion of the main system 101, and a power supply is not supplied to the sub-systems 102 and 103. In the standby state, a power supply is supplied to the main system DRAM 106; it is in a self-refresh state, and values thereof are retained. Information of computer programs is saved in the main system DRAM 106. The standby state is a power state used in a case in which reducing power consumption is desired, such as a case in which a user does not use the image forming apparatus 100 for a long time. In the standby state, because a power supply is not supplied to the sub-systems 102 and 103, there is no necessity for the sub-systems 102 and 103 to notify the main system 101 of period to transition from the standby state to the operational state.

Power source states and recovery periods of components in the main system 101 and the sub-systems 102 and 103 when in the power saving state are illustrated in FIG. 5. In the power saving state, a power supply is supplied to the main system 101 and the sub-systems 102 and 103. In the power saving state, the sub-systems 102 and 103 have a plurality of power states, and, in accordance with each power state, whether components in the sub-systems 102 and 103 are supplied with a power supply is determined. When transitioning to the power saving state, the sub-systems 102 and 103 must notify a recovery period to the main system 101.

In the power saving state, the sub-system 102 has four power states: an NW (NetWork) response state, a USB response state, an NW & USB response state, and an operation stop state. However, when the image forming apparatus 100 is in the power saving state, power states for each component of the sub-system 102 differ in accordance with which of the NW response state, the USB response state, the NW & USB response state, and the operation stop state that the sub-system 102 is in.

In the NW response state, a power supply is supplied to the CPU 301, the DRAM IF unit 303, the network IF unit 305, the internal power supply control unit 307 and the sub-system DRAM 107, and a power supply is not supplied (is disconnected) with respect to other components. In other words, the NW response state is a state in which the image forming apparatus 100 can respond to a network packet transmitted by a communication device such as a router, or an information device such as a PC. In the NW response state, the CPU 301 may perform an operation that analyzes the network packet and determines whether to cause the image forming apparatus 100 to transition to an operational state in accordance with a result of the analysis. With this, because it is possible to cause the image forming apparatus 100 to transition to an operational state only when a network packet for which transition to the operational state is necessary is transmitted, reduction of power consumption is possible.

In a USB response state, a power supply is supplied to the CPU 301, the DRAM IF unit 303, the USB IF unit 306, the internal power supply control unit 307 and the sub-system DRAM 107, and a power supply is not supplied (is disconnected) with respect to other components. In other words, the USB response state is a state in which the image forming apparatus 100 can respond to USB data transmitted from a PC or the like. Similarly to in the NW response state, the CPU 301 may perform an operation that analyzes USB data and determines whether to cause the image forming apparatus 100 to transition to an operational state in accordance with a result of the analysis. With this, because it is possible to cause the image forming apparatus 100 to transition to an operational state only when USB data for which transition to the operational state is necessary is transmitted, reduction of power consumption is possible.

In the NW & USB response state, a power supply is supplied to the CPU 301, the DRAM IF unit 303, the network IF unit 305, the USB IF unit 306, the internal power supply control unit 307, and the sub-system DRAM 107, and a power supply is not supplied (is disconnected) with respect to other components. The NW & USB response state is a state in which the image forming apparatus 100 can respond to a network packet and USB data.

In the operation stop state, a power supply is supplied to the CPU 301 and the DRAM IF unit 303, and a power supply is not supplied (is disconnected) with respect to other components. The operation stop state is a state in which processing is not possible. Note that configuration may be taken such that, in this state, a power supply is supplied to the sub-system DRAM 107, putting it in a self-refresh state, and thereby values thereof are retained.

The designation of these power states of the sub-system 102 may be performed by a user operating the operation unit 111. In addition, information of whether a network connector or a USB connector is connected to the image forming apparatus 100 is retained by the network IF unit 305 or the USB IF unit 306, and configuration may be taken to determine a power state of the sub-system 102 in the power saving state by the CPU 301 reading this information. In such a case, it is necessary to prepare in advance information for specifying a power state that corresponds to a type of a device connected to the image forming apparatus 100.

Meanwhile, in the power saving state, the sub-system 103 has four states: an image processing setting information retention state, a FAX response state, an image processing setting information retention & FAX response state, and an operation stop state. If the image forming apparatus 100 is in the power saving state, a power state for each component of the sub-system 103 differs in accordance with which of the image processing setting information retention state, the FAX response state, the image processing setting information retention & FAX response state, or the operation stop state that the sub-system 103 is in.

In the setting information retention state, a power supply is supplied to the CPU 401, the DRAM IF unit 403, the setting information storage unit 406, the internal power source control unit 410 and the sub-system DRAM 113, and a power supply is not supplied (is disconnected) with respect to other components. In the setting information retention state, because it is not necessity to reset setting information, it is possible to shorten the recovery period of the sub-system 103.

In the FAX response state, a power supply is supplied to the CPU 401, the DRAM IF unit 403, the FAX IF unit 409, the internal power source control unit 410 and the sub-system DRAM 113, and a power supply is not supplied (is disconnected) with respect to other components. The FAX response state is a state in which the image forming apparatus 100 can respond to FAX data transmitted from an external unit.

In the setting information retention & FAX response state, a power supply is supplied to the CPU 401, the DRAM IF unit 403, the setting information storage unit 406, the FAX IF unit 409, the internal power source control unit 410, and the sub-system DRAM 113, and a power supply is not supplied (is disconnected) with respect to other components. The setting information retention & FAX response state is a state in which the image forming apparatus 100 can respond to FAX data transmitted from an external unit. Also, in the setting information retention & FAX response state, because it is not necessity to reset setting information, it is possible to shorten the recovery period of the sub-system 103.

In the operation stop state, a power supply is supplied to the CPU 401 and the DRAM IF unit 403, and a power supply is not supplied (is disconnected) with respect to other components. In the operation stop state, the state is such that processing is not possible. Configuration may be taken such that, in this state, a power supply is supplied to the sub-system DRAM 113, putting it in a self-refresh state, and thereby values thereof are retained.

The designation of these power states of the sub-system 103 may be performed by a user operating the operation unit 111. In addition, configuration may be taken so that the CPU 401 designates in accordance with the FAX IF unit 409 determining whether the FAX unit 116 is connected to the image forming apparatus 100 and notifying to the CPU 401.

In each power state of the sub-systems 102 and 103 in the power saving state, the fewer components of the sub-systems 102 and 103 to which a power supply is supplied, the longer the recovery period becomes due to the need for initial setting when transitioning from the power saving state to the operational state. In addition, time required for the initial setting is different depending on the component.

Figure 6A:
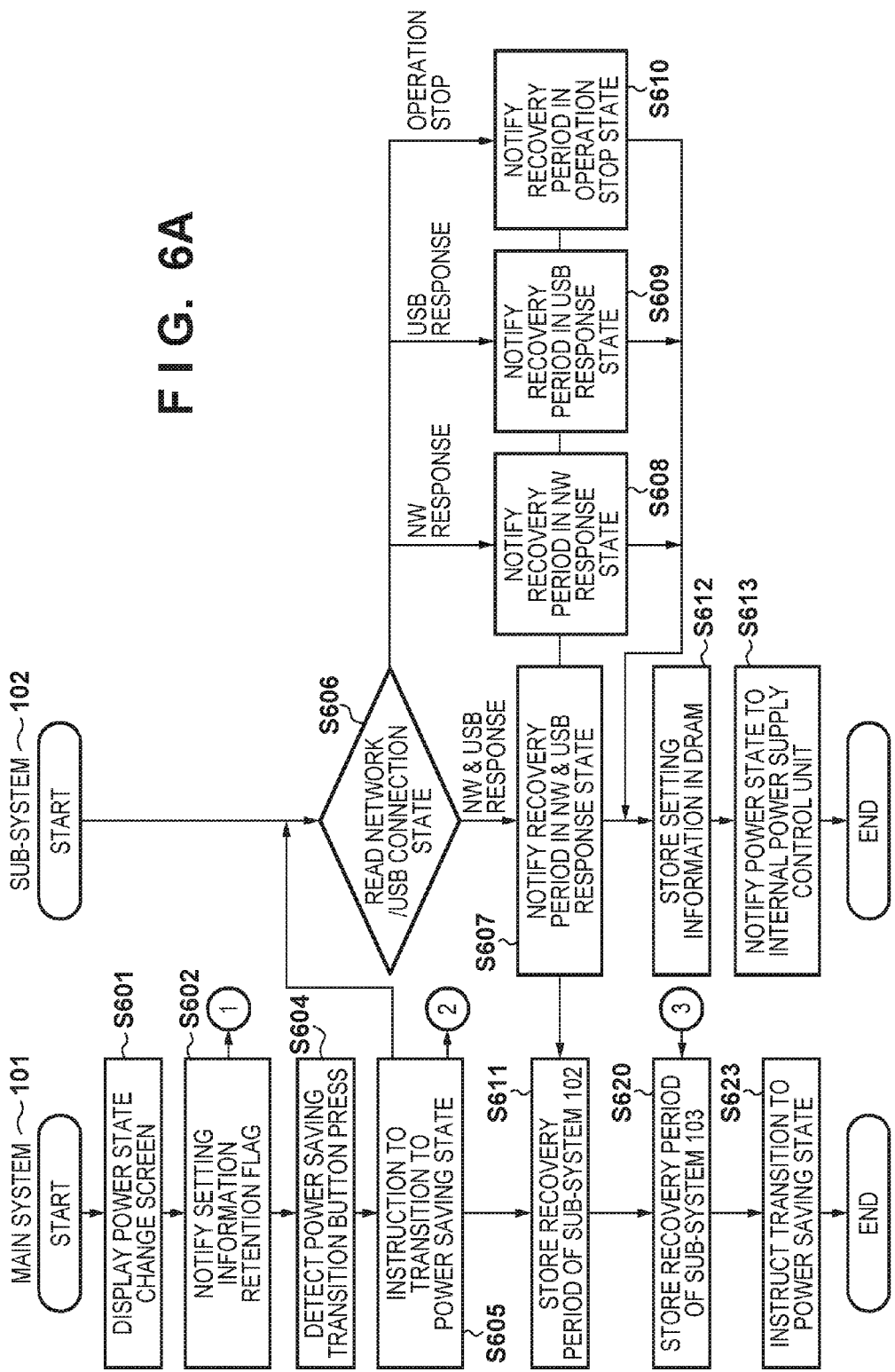

Next, flowcharts of FIGS. 6A and 6B are used to explain processing that each of the CPU 201 of the main system 101, the CPU 301 of the sub-system 102, and the CPU 401 of the sub-system 103 perform for the image forming apparatus 100, which is in the operational state, to transition to the power saving state.

In the flowcharts of FIGS. 6A and 6B, processing in each step of step S601, step S602, step S604, step S605, step S611, step S620, and step S623 is performed by the CPU 201 of the main system 101 using a computer program or data stored in the main system HDD 109 or the main system ROM 110 to execute the processing.

In the flowcharts of FIGS. 6A and 6B, processing in each step of step S606 to step S610, step S612, and step S613 is performed by the CPU 301 of the sub-system 102 using a computer program or data stored in the sub-system ROM 105 to execute the processing.

Also, in the flowcharts of FIGS. 6A and 6B, processing in each step of step S603, step S614 to step S619, step S621, and step S622 is performed by the CPU 401 of the sub-system 103 using a computer program or data stored in the sub-system ROM 112 to execute the processing.

Note that, in the present embodiment, designation of whether the sub-system 103 retains the setting information is performed by a user operating the operation unit 111.

<Step S601>

Figure 7:
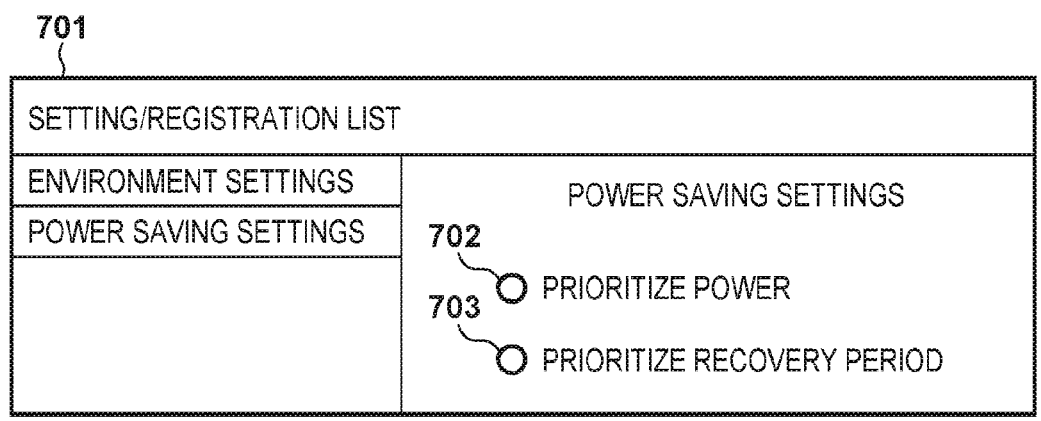
FIG. 7 is a view for illustrating a display example of a power supply state change screen.

On a display screen that the operation unit 111 comprises, the CPU 201 displays a power state change screen, which is an example of a GUI for changing the power state of the image forming apparatus 100. A display example of the power state change screen is illustrated in FIG. 7. Buttons 702 and 703 are provided in a power state change screen 701 of FIG. 7. It is possible to switch selection/non-selection of the buttons 702 and 703 each time a user touches the buttons 702 or 703 displayed on the display screen or each time a user operates a hard key that the operation unit 111 comprises. Note that it only possible to select one of the button 702 and the button 703. However, if a user selects the button 702, the button 703 enters a deselected state, and if a user selects the button 703, the button 702 enters a deselected state. Control of the power state change screen 701 is performed by the CPU 201.

Upon selection of the button 702, the CPU 201 sets an energy-saving setting of the image forming apparatus 100 to prioritize low power. Upon selection of the button 703, the CPU 201 sets an energy-saving setting of the image forming apparatus 100 to prioritize shortness of the period for recovery to the normal operational state from the power saving state. In addition, when the button 702 is selected, the CPU 201 sets a setting information retention flag for determining a power state in the power saving state of the sub-system 103 to OFF (for example, sets the setting information retention flag to "0"), and when the button 703 is selected, sets the setting information retention flag to ON (for example, sets the setting information retention flag to "1").

<Step S602>

The CPU 201 transmits the setting information retention flag set in step S601 to the sub-system 103, via the sub-system IF unit 208.

<Step S603>

The CPU 401 of the sub-system 103 side receives, via the main system IF unit 404, the setting information retention flag transmitted from the main system 101, and stores the received setting information retention flag in the sub-system DRAM 113.

<Step S604>

If a user has operated a "button for causing the power state of the image forming apparatus 100 to transition from the operational state to the power saving state" (may be a hard key, or may be a touchable button displayed on the display screen that the operation unit 111 has) that the operation unit 111 is provided with, the CPU 201 detects the operation.

<Step S605>
With respect to each of the sub-system 102 and the sub-system 103, the CPU 201 outputs, via the sub-system IF unit 207 and the sub-system IF unit 208, an instruction to transition to the power saving state.

<Step S606>
The CPU 301 on the sub-system 102 side reads state information stored in the network IF unit 305, and determines whether the state information indicates that "a network connector is connected to the network IF unit 305". In addition, the CPU 301 reads state information stored in the USB IF unit 306, and determines whether the state information indicates that "a USB connector is connected to the USB IF unit 306".

As a result of these determinations, if a network connector is connected to the network IF unit 305 and a USB connector is connected to the USB IF unit 306, the processing proceeds to step S607.

Also, if a network connector is connected to the network IF unit 305 and a USB connector is not connected to the USB IF unit 306, the processing proceeds to step S608.

Also, if a network connector is not connected to the network IF unit 305 and a USB connector is connected to the USB IF unit 306, the processing proceeds to step S609.

Also, if a network connector is not connected to the network IF unit 305 and a USB connector is not connected to the USB IF unit 306, the processing proceeds to step S610.

<Step S607>
The CPU 301 determines to set the power state of the sub-system 102 in the power saving state to be the NW & USB response state, and notifies a recovery period (25 msec in the case of FIG. 5) of the sub-system 102 in the NW & USB response state to the main system 101.

<Step S608>
The CPU 301 determines to set the power state of the sub-system 102 in the power saving state to the NW response state, and notifies the recovery period (50 msec in the case of FIG. 5) of the sub-system 102 in the NW response state to the main system 101.

<Step S609>
The CPU 301 determines to set the power state of the sub-system 102 in the power saving state to the USB response state, and notifies the recovery period (50 msec in the case of FIG. 5) of the sub-system 102 in the USB response state to the main system 101.

<Step S610>
The CPU 301 determines to set the power state of the sub-system 102 in the power saving state to the operation stop state, and notifies the recovery period (200 msec in the case of FIG. 5) of the sub-system 102 in the operation stop state to the main system 101.

<Step S611>
Upon receiving, via the sub-system IF unit 207, any of the recovery periods notified in step S607 to step S610, the CPU 201 of the main system 101 side stores the recovery period in the main system DRAM 106.

<Step S612>
The CPU 301 of the sub-system 102 side stores, in the sub-system DRAM 107, the setting information of components in the sub-system 102 for which the power supply is disconnected in a power state determined in step S607 to step S610.

<Step S613>
The CPU 301 stores the power state determined in any of step S607 to step S610 in the sub-system DRAM 107, and notifies it to the internal power supply control unit 307.

Upon receiving a notification of the determined power state from the CPU 301, the internal power supply control unit 307 completes the transition of the sub-system 102 to the power saving state by controlling (in FIG. 5, setting to a power state that corresponds to the notified power state), in accordance with the notified power state, ON/OFF of a power supply with respect to each component in the sub-system 102.

<Step S614>
Upon receiving, from the main system 101, an instruction to transition to the power saving state, the CPU 401 of the sub-system 103 side reads the setting information retention flag stored in the sub-system DRAM 113 in step S603.

<Step S615>
In addition, the CPU 401 reads state information stored in the FAX IF unit 409, and determines whether (a connection state) the state information indicates that "the FAX unit 116 is connected to the FAX IF unit 409".

If the setting information retention flag is ON and the FAX unit 116 is connected to the FAX IF unit 409, the processing proceeds to step S618. Also, if the setting information retention flag is ON and the FAX unit 116 is not connected to the FAX IF unit 409, the processing proceeds to step S616. Also, if the setting information retention flag is OFF and the FAX unit 116 is connected to the FAX IF unit 409, the processing proceeds to step S617. Also, if the setting information retention flag is OFF and the FAX unit 116 is not connected to the FAX IF unit 409, the processing proceeds to step S619.

<Step S616>
The CPU 401 determines to set the power state of the sub-system 103 in the power saving state to the setting information retention state, and notifies the recovery period (50 msec in the case of FIG. 5) of the sub-system 103 in the setting information retention state to the main system 101.

<Step S617>
The CPU 401 determines to set the power state of the sub-system 103 in the power saving state to the FAX response state, and notifies the recovery period (350 msec in the case of FIG. 5) of the sub-system 103 in the FAX response state to the main system 101.

<Step S618>
The CPU 401 determines to set the power state of the sub-system 103 in the power saving state to be the setting information retention & FAX response state, and notifies a recovery period (25 msec in the case of FIG. 5) of the sub-system 103 in the setting information retention & FAX response state to the main system 101.

<Step S619>
The CPU 401 determines to set the power state of the sub-system 103 in the power saving state to the operation stop state, and notifies the recovery period (500 msec in the case of FIG. 5) of the sub-system 103 in the operation stop state to the main system 101.

Note that configuration may be taken to hold a storage region in which to set the recovery period in the main system IF unit 304 (the main system IF unit 404), and notify the recovery period by communication that complies with a PCIe protocol, or the recovery period may be notified by the main system 101 reading the storage region.

<Step S620>
Upon receiving, via the sub-system IF unit 208, any of the recovery periods notified in step S616 to step S619, the CPU 201 of the main system 101 side stores the recovery period in the main system DRAM 106.

<Step S621>

The CPU 401 of the sub-system 103 side stores, in the sub-system DRAM 113, the setting information of components in the sub-system 103 for which the power supply is disconnected in a power state determined in any of step S616 to step S619.

<Step S622>

The CPU 401 stores the power state determined in any of step S616 to step S619 in the sub-system DRAM 113, and notifies it to the internal power source control unit 410. Upon receiving a notification of the determined power state from the CPU 401, the internal power source control unit 410 completes the transition of the sub-system 103 to the power saving state by controlling (in FIG. 5, setting to a power state that corresponds to the notified power state), in accordance with the notified power state, ON/OFF of a power supply with respect to each component in the sub-system 103.

<Step S623>

The CPU 201 of the main system 101 side makes an instruction to transition to the power saving state, towards the power supply control unit 104. By instructing the power supply unit 108, the power supply control unit 104 performs power supply control of the image forming apparatus 100, the power supply state described in FIG. 5 is changed to, and transition to the power saving state completes. At this point the CPU 201 of the main system 101 determines a power saving mode to transition to from the plurality of power saving modes, based on the recovery periods obtained from the sub-system 102 and the sub-system 103. The CPU 201 of the main system 101 then transitions to the determined power saving mode. Specifically, the CPU 201 determines the power saving mode to transition to based on the shortest recovery period of the recovery periods obtained from the sub-system 102 and the sub-system 103. If the shortest recovery period is longer, the CPU 201 transitions to a deep power saving mode, for which an amount of power consumption is smaller, and if the shortest recovery period is relatively short, the CPU 201 transitions to a shallow power saving mode for which the amount of power consumption is larger. The deep power saving mode has a low amount of power consumption, but the recovery period that the CPU 201 requires to recover from the deep power saving mode becomes longer. On the other hand, the shallow power saving mode has a high amount of power consumption, but the recovery period that the CPU 201 requires to recover from the shallow power saving mode becomes shorter.

Figure 8:
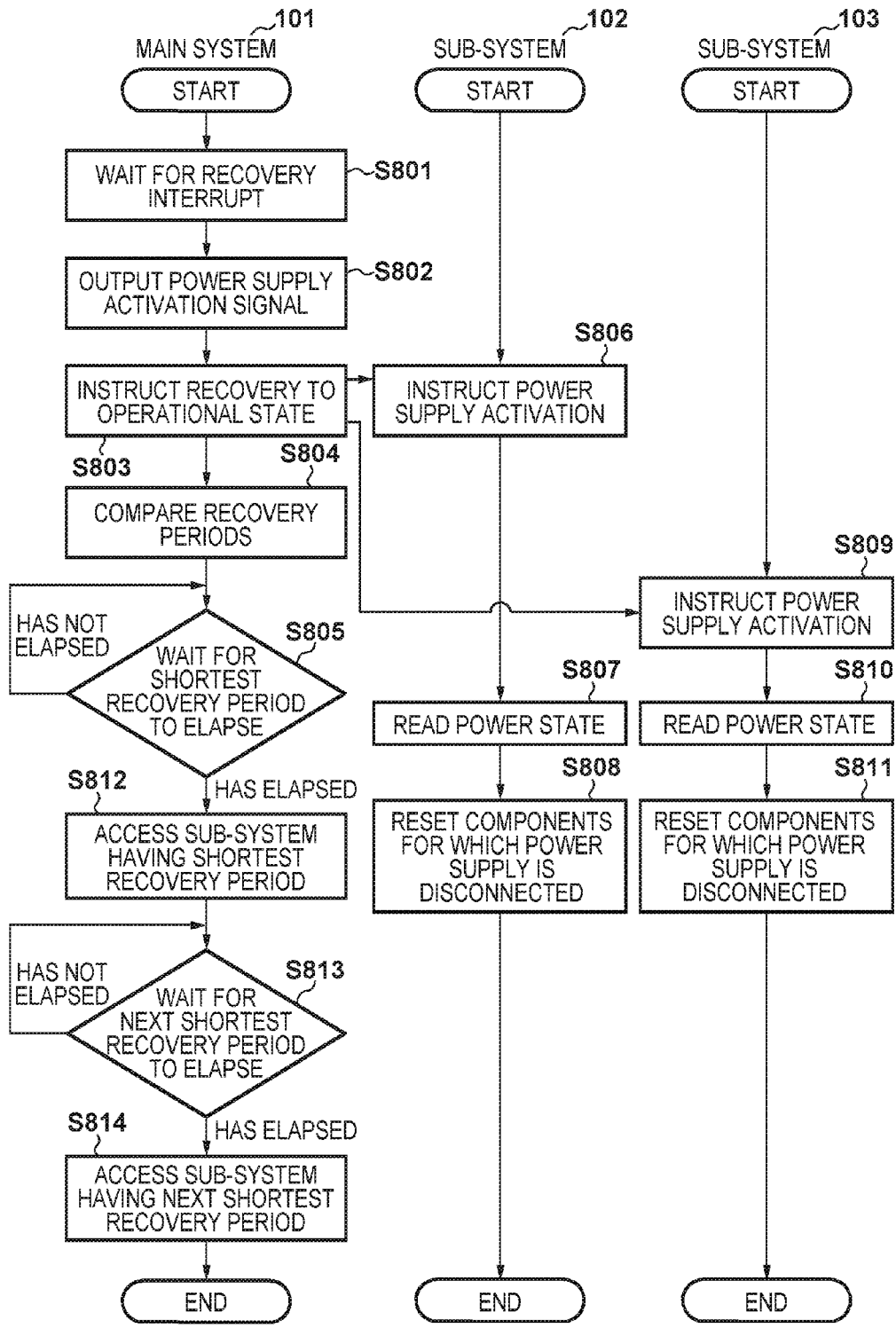
FIG. 8 is a flowchart of processing to transition from an operational state to a power saving state.

Next, a flowchart of FIG. 8 is used to explain processing performed by each of the CPU 201 of the main system 101, the CPU 301 of the sub-system 102, and the CPU 401 of the sub-system 103 to cause the image forming apparatus 100, which has transitioned to the power saving state via processing in accordance with the flowcharts of FIGS. 6A and 6B, to transition to the operational state.

In the flowchart of FIG. 8, processing in each step of step S801 to step S805 and step S812 to step S814 is performed by the CPU 201 of the main system 101 using a computer program or data stored in the main system HDD 109 or the main system ROM 110 to execute the processing.

In the flowchart of FIG. 8, processing in each step of step S806 to step S808 is performed by the CPU 301 of the sub-system 102 using a computer program or data stored in the sub-system ROM 105 to execute the processing.

In the flowchart of FIG. 8, processing in each step of step S809 to step S811 is performed by the CPU 401 of the sub-system 103 using a computer program or data stored in the sub-system ROM 112 to execute the processing.

<Step S801>

The CPU 201 of the main system 101 side is in a state of waiting for a recovery interrupt from the power supply control unit 104, and upon receiving a recovery interrupt from the power supply control unit 104, the processing proceeds to step S802.

<Step S802>

The CPU 201 outputs a power supply activation signal to the power supply control unit 104. The power supply control unit 104, which has received the power supply activation signal, instructs the power supply unit 108 so as to supply a power supply to all components of the image forming apparatus 100.

<Step S803>

The CPU 201 makes a recovery instruction with respect to the sub-systems 102 and 103, via the corresponding sub-system IF units 207 and 208.

<Step S804>

The CPU 201 compares the recovery period stored in the main system DRAM 106 in step S611 described above and the recovery period stored in the main system DRAM 106 in step S620, and identifies which of the recovery periods is shorter.

<Step S805>

The CPU 201 uses an internal timer (not shown) to measure an elapsed time after processing initiation of step S802 (after start of the processing for recovery to the operational state), and determines whether the elapsed time exceeds the recovery period identified in step S804. If the result of the determination is that it does exceed the recovery period, the processing proceeds to step S812, and if it does not exceed it the processing waits in step S805. For example, assuming that the recovery period received from the sub-system 102<the recovery period received from the sub-system 103, in a case in which it can be determined that the elapsed time exceeds the recovery period received from the sub-system 102, i.e. that the recovery of the sub-system 102 has completed, the processing proceeds to step S812.

<Step S806>

Upon receiving the recovery instruction from the main system 101 via the main system IF unit 304, the CPU 301 of the sub-system 102 side instructs power supply activation to the internal power supply control unit 307. The internal power supply control unit 307, which has received the power supply activation instruction, supplies a power supply to all components of the sub-system 102.

<Step S807>

The CPU 301 reads the "power state of the sub-system 102 in the power saving state" stored in the sub-system DRAM 107 in step S613.

<Step S808>

The CPU 301 reads the setting information stored in the sub-system DRAM 107 in step S612, i.e. the setting information of the components in the sub-system 102 for which power supply is disconnected in the power state determined in any of step S607 to step S610, and uses the setting information to reset the components in the sub-system 102 for which power supply is disconnected in the power state determined in any of step S607 to step S610.

<Step S809>

Upon receiving the recovery instruction from the main system 101 via the main system IF unit 404, the CPU 401 of the sub-system 103 side instructs power supply activation to the internal power source control unit 410. The internal power source control unit 410, which has received the power supply activation instruction, supplies a power supply to all components of the sub-system 103.

<Step S810>

The CPU 401 reads the "power state of the sub-system 103 in the power saving state" stored in the sub-system DRAM 113 in step S622.

<Step S811>

The CPU 301 reads the setting information stored in the sub-system DRAM 113 in step S621, i.e. the setting information of the components in the sub-system 103 for which power supply is disconnected in the power state determined in any of step S616 to step S619, and uses the setting information to reset the components in the sub-system 103 for which power supply is disconnected in the power state determined in any of step S616 to step S619.

<Step S812>

With respect to the sub-system corresponding to the recovery period identified in step S804 (the sub-system 102 if the recovery period received from the sub-system 102<the recovery period received from the sub-system 103, or the sub-system 103 if the recovery period received from the sub-system 102>the recovery period received from the sub-system 103), the CPU 201 of the main system 101 side starts access via a corresponding IF unit, and performs recovery processing.

<Step S813>

The CPU 201 determines whether the elapsed time exceeds another recovery period different to the recovery period identified in step S804. If the result of the determination is that it does exceed the recovery period, the processing proceeds to step S814, and if it does not exceed it the processing waits in step S813. For example, assuming that the recovery period received from the sub-system 102<the recovery period received from the sub-system 103, in a case in which it can be determined that the elapsed time exceeds the recovery period received from the sub-system 103, i.e. that the recovery of the sub-system 103 has completed, the processing proceeds to step S814.

<Step S814>

With respect to the sub-system corresponding to the recovery period other than the recovery period identified in step S804 (the sub-system 103 if the recovery period received from the sub-system 102<the recovery period received from the sub-system 103, or the sub-system 102 if the recovery period received from the sub-system 102>the recovery period received from the sub-system 103), the CPU 201 of the main system 101 side starts access via a corresponding IF unit, and performs recovery processing.

In this way, by virtue of the present embodiment, in a case where the sub-systems 102 and 103, which are in the power saving state, have a plurality of power states for which recovery periods are different, it is possible to notify recovery periods corresponding to power states to the main system 101. With this, when the image forming apparatus 100 recovers from the power saving state, recovery in a minimum period in accordance with the power states of the sub-systems 102 and 103 is possible. Furthermore, even if the main system 101 is connected to a plurality of sub-systems, it is possible to notify the main system 101 of recovery periods in accordance with the power states of each sub-system.

Second Embodiment

In the first embodiment, explanation was given of a configuration in which the main system 101 is connected to a plurality of sub-systems (the sub-systems 102 and 103), and the power supply control unit 104 manages a cause for transitioning the image forming apparatus 100 from the power saving state to the operational state. In the present embodiment, explanation is given of a configuration in which the main system 101 is connected to a single sub-system 102, and the sub-system 102 manages a cause for transitioning from the power saving state to the operational state. Below, explanation is given predominantly regarding differences with the first embodiment, and to the extent that something is not touched upon particularly below, it is the same as in the first embodiment.

Figure 9:
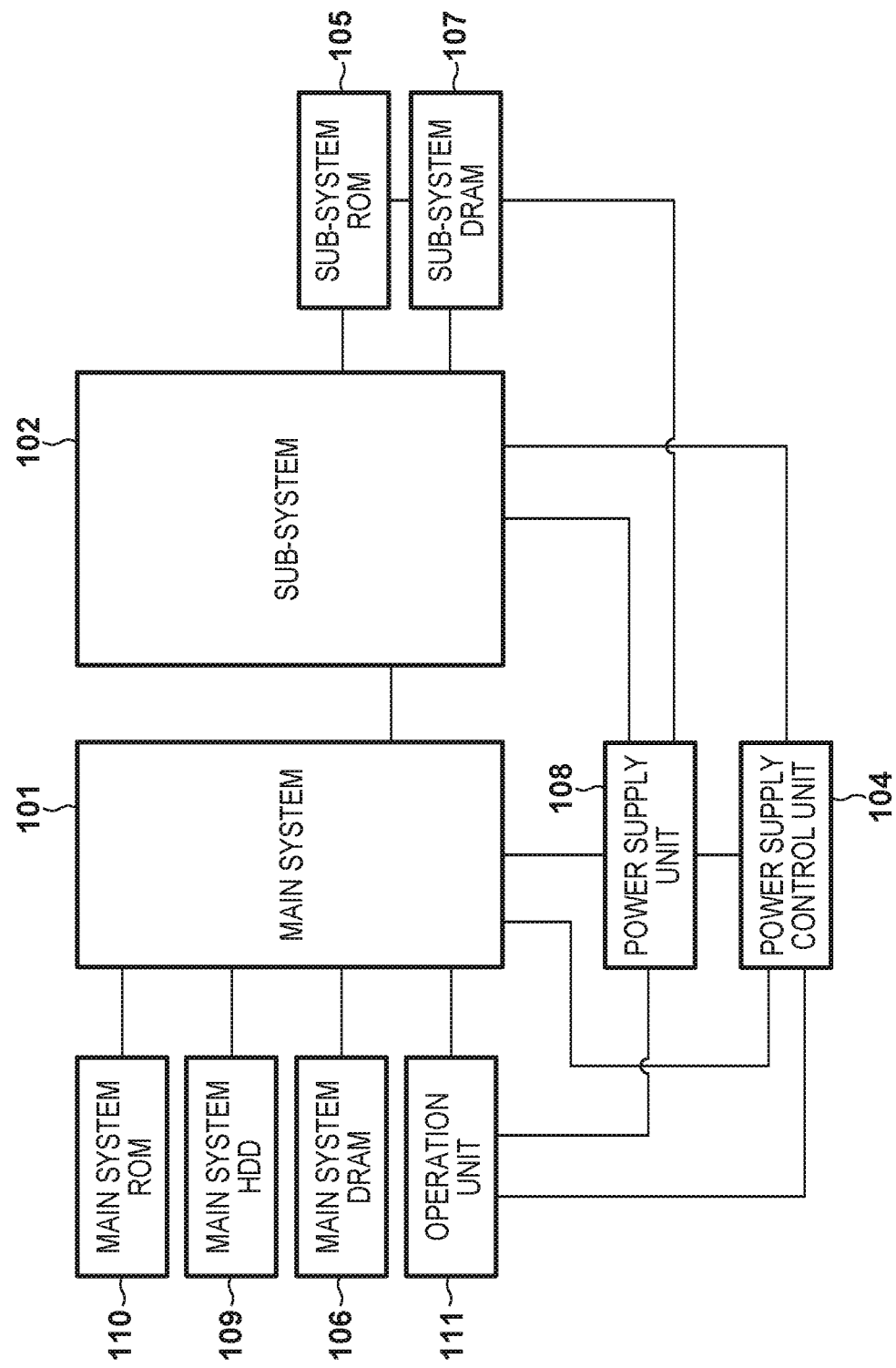
FIG. 9 is a block diagram for illustrating an example configuration of an information processing apparatus 1000.

A block diagram of FIG. 9 is used to explain an example configuration of an information processing apparatus 1000 according to the present embodiment. In FIG. 9, functional units that are the same as functional units illustrated in FIG. 1 are given the same reference numerals, and explanation corresponding to these functional unit is omitted. A configuration illustrated in FIG. 9 has the sub-system 103, the FAX unit 116, the printer unit 114, the scanner unit 115, the sub-system ROM 112, and the sub-system DRAM 113 eliminated from the configuration illustrated in FIG. 1.

In the present embodiment, the sub-system 102 in the power saving state has three states: an all power supply on state, a NW response state, and an operation stop state. Power states and recovery periods for components in the sub-system 102 in each of the all power supply on state, the NW response state, and the operation stop state are illustrated in FIG. 10. Note that power states and transition operations that the information processing apparatus 1000 can take are the same as those of the image forming apparatus 100 of the first embodiment.

In the all power supply on state, a power supply is supplied to all components of the sub-system 102. Note that a power supply is supplied, but it is possible to reduce power consumption such as by stopping a clock by which the internal power supply control unit 307 supplies each component.

In the NW response state, a power supply is supplied to the CPU 301, the DRAM IF unit 303, the network IF unit 305, the internal power supply control unit 307 and the sub-system DRAM 107, and a power supply is not supplied (is disconnected) with respect to other components. In other words, the NW response state is a state in which the information processing apparatus 1000 can respond to a network packet transmitted by a communication device such as a router, or an information device such as a PC.

In the operation stop state, a power supply is supplied to the CPU 301 and the DRAM IF unit 303, and a power supply is not supplied (is disconnected) with respect to other components. The operation stop state is a state in which processing is not possible. Note that configuration may be taken such that, in this state, a power supply is supplied to the sub-system DRAM 107, putting it in a self-refresh state, and thereby values thereof are retained.

The designation of these power states of the sub-system 102 may be performed by a user operating the operation unit 111.

Figure 11:
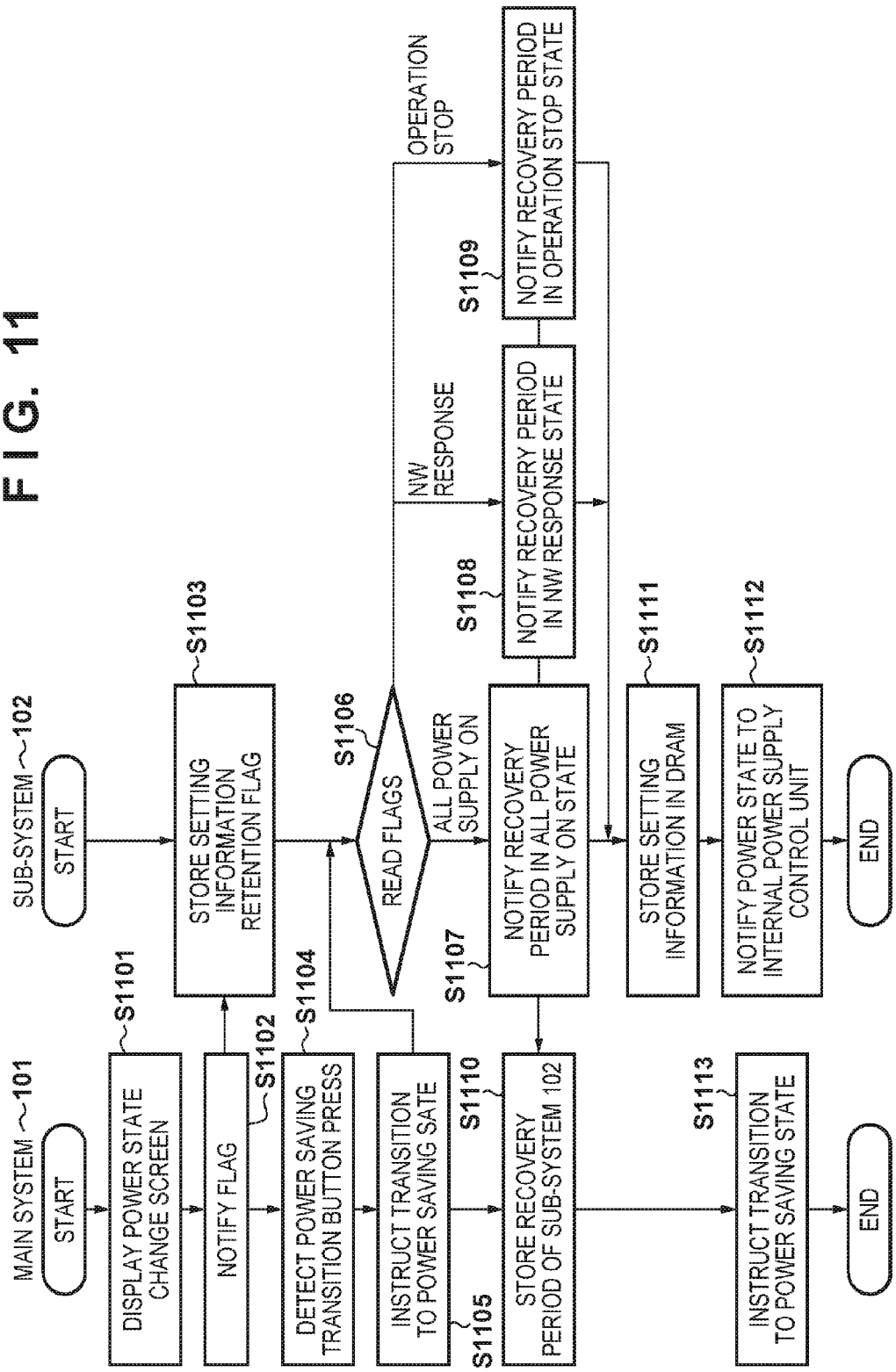
FIG. 11 is a flowchart of processing to transition from an operational state to a power saving state.

Next, a flowchart of FIG. 11 is used to explain processing that each of the CPU 201 of the main system 101, and the CPU 301 of the sub-system 102 perform for the information processing apparatus 1000, which is in the operational state, to transition to the power saving state.

In the flowchart of FIG. 11, processing in each step of step S1101, step S1102, step S1104, step S1105, step S1110, and step S1113 is performed by the CPU 201 of the main system 101 using a computer program or data stored in the main system HDD 109 or the main system ROM 110 to execute the processing.

In the flowchart of FIG. 11, processing in each step of step S1103, step S1106 to step S1109, step S1111, and step S1112 is performed by the CPU 301 of the sub-system 102 using a computer program or data stored in the sub-system ROM 105 to execute the processing.

<Step S1101>

Figure 12:
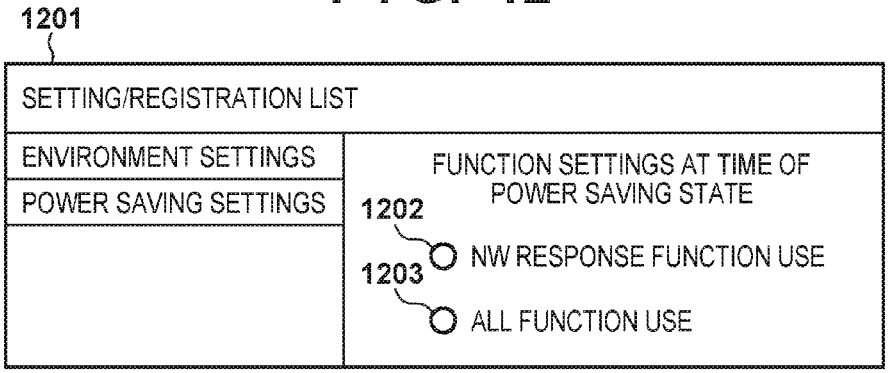
FIG. 12 is a view for illustrating a display example of a power state change screen.

On a display screen that the operation unit 111 comprises, the CPU 201 displays a power state change screen, which is an example of a GUI for changing the power state of the information processing apparatus 1000. A display example of the power state change screen is illustrated in FIG. 12. Buttons 1202 and 1203 are provided in a power state change screen 1201 of FIG. 12. It is possible to switch selection/non-selection of the buttons 1202 and 1203 each time a user touches the button 1202 or 1203 displayed on the display screen or each time a user operates a hard key that the operation unit 111 comprises. Note that it only possible to select one of the button 1202 and the button 1203. However, if a user selects the button 1202, the button 1203 enters a deselected state, and if a user selects the button 1203, the button 1202 enters a deselected state. Control of the power state change screen 1201 is performed by the CPU 201.

When the button 1202 is selected, the CPU 201 sets that the information processing apparatus 1000, in the power saving state, uses a function that responds to a NW packet. In addition, when the button 1203 is selected, the CPU 201 sets that all functions are used, despite being in the power saving state. However, when the button 1202 is selected, the CPU 201 sets the flag A, which is for determining a power state in the power saving state of the sub-system 102, to ON, and sets the flag B to OFF (for example, sets the flag A to "1", and sets the flag B to "0"). However, when the button 1203 is selected, the CPU 201 sets the flag A, which is for determining a power state in the power saving state of the sub-system 102, to OFF, and sets the flag B to ON (for example, sets the flag A to "0", and sets the flag B to "1"). Note that, if neither of the buttons 1202 and 1203 in the power state change screen 1201 of FIG. 12 are selected, the flag A and the flag B both become OFF.

<Step S1102>

The CPU 201 transmits the flag A and the flag B set in step S1101 via the sub-system IF unit 207 to the sub-system 102.

<Step S1103>

The CPU 301 of the sub-system 102 side receives, via the main system IF unit 304, the flag A and the flag B transmitted from the main system 101, and stores the received the flag A and the flag B in the sub-system DRAM 107.

<Step S1104>

If a user has operated a "button for causing the power state of the information processing apparatus 1000 to transition from the operational state to the power saving state" (may be a hard key, or may be a touchable button displayed on the display screen that the operation unit 111 has) that the operation unit 111 is provided with, the CPU 201 detects the operation.

<Step S1105>

The CPU 201 outputs an instruction to transition to the power saving state to the sub-system 102, via the sub-system IF unit 207.

<Step S1106>

The CPU 301 of the sub-system 102 side reads the flag A and the flag B stored in the sub-system DRAM 107 in step S1103. If the flag A=OFF and the flag B=ON, the processing proceeds to step S1107. If the flag A=ON and the flag B=OFF, the processing proceeds to step S1108. If the flag A=OFF and the flag B=OFF, the processing proceeds to step S1109.

<Step S1107>

The CPU 301 determines to set the power state of the sub-system 102 in the power saving state to the all power supply on state, and notifies the recovery period (5 msec in the case of FIG. 10) of the sub-system 102 in the all power supply on state to the main system 101.

<Step S1108>

The CPU 301 determines to set the power state of the sub-system 102 in the power saving state to the NW response state, and notifies the main system 101 of the recovery period (50 msec in the case of FIG. 10) of the sub-system 102 in the NW response state.

<Step S1109>

The CPU 301 determines to set the power state of the sub-system 102 in the power saving state to the operation stop state, and notifies the main system 101 of the recovery period (200 msec in the case of FIG. 10) of the sub-system 102 in the operation stop state.

<Step S1110>

Upon receiving, via the sub-system IF unit 207, any of the recovery periods notified in step S1107 to step S1109, the CPU 201 of the main system 101 side stores the recovery period in the main system DRAM 106.

<Step S1111>

The CPU 301 of the sub-system 102 side stores, in the sub-system DRAM 107, the setting information of components in the sub-system 102 for which the power supply is disconnected in a power state determined in step S1107 to step S1109.

<Step S1112>

The CPU 301 stores the power state determined in any of step S1107 to step S1109 in the sub-system DRAM 107, and notifies it to the internal power supply control unit 307. Upon receiving a notification of the determined power state from the CPU 301, the internal power supply control unit 307 completes the transition of the sub-system 102 to the power saving state by controlling (in FIG. 10, setting to a power state that corresponds to the notified power state), in accordance with the notified power state, ON/OFF of a power supply with respect to each component in the sub-system 102.

<Step S1113>

The CPU 201 of the main system 101 side makes an instruction to transition to the power saving state, towards the power supply control unit 104. By instructing the power supply unit 108, the power supply control unit 104 performs power supply control of the information processing apparatus 1000, the power supply state recited in FIG. 10 is changed to, and transition to the power saving state completes.

Figure 13:
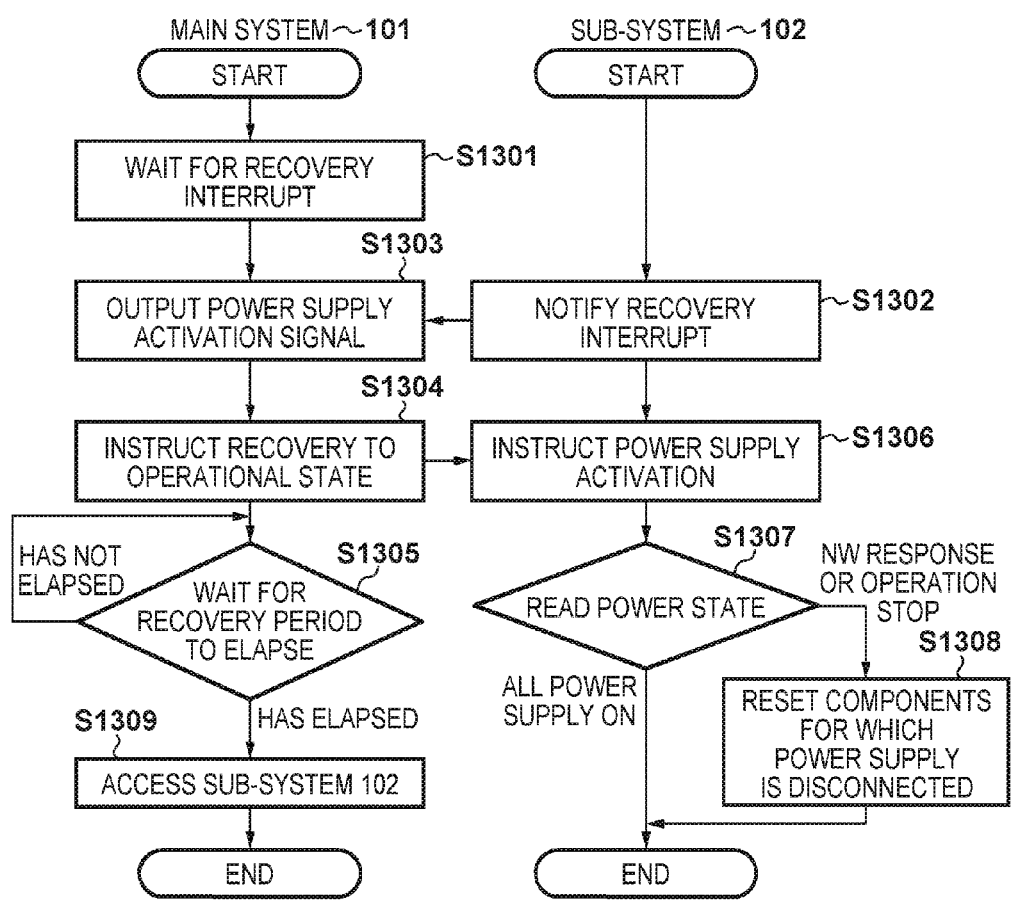
FIG. 13 is a flowchart of processing to transition from a power saving state to an operational state.

Next, a flowchart of FIG. 11 is used to explain processing performed by each of the CPU 201 of the main system 101, and the CPU 301 of the sub-system 102 to cause the information processing apparatus 1000, which has transitioned to the power saving state via processing in accordance with the flowchart of FIG. 13, to transition to the operational state.

In the flowchart of FIG. 13, processing in each step of step S1301, step S1303 to step S1305 and step S1309 is performed by the CPU 201 of the main system 101 using a computer program or data stored in the main system HDD 109 or the main system ROM 110 to execute the processing.

Also, in the flowchart of FIG. 13, processing in each step of step S1302, and step S1306 to step S1308 is performed by the CPU 301 of the sub-system 102 using a computer program or data stored in the sub-system ROM 105 to execute the processing.

In the present embodiment, the instruction to transition to the operational state of the information processing apparatus 1000 is performed by the CPU 301 of the sub-system 102. Of course, this may be performed by the power supply control unit 104 as in the first embodiment.

<Step S1301>

The CPU 201 of the main system 101 side is in a state of waiting for a recovery interrupt from the CPU 301 of the sub-system 102.

<Step S1302>

The CPU 301 of the sub-system 102 side outputs a recovery interrupt to the main system 101.

<Step S1302>

Upon receiving the recovery interrupt from the CPU 301 of the sub-system 102, the CPU 201 outputs a power supply activation signal to the power supply control unit 104. The power supply control unit 104, which has received the power supply activation signal, instructs the power supply unit 108 so as to supply a power supply to all components of the information processing apparatus 1000.

<Step S1304>

The CPU 201 makes a recovery instruction with respect to the sub-system 102 via the sub-system IF unit 207.

<Step S1305>

The CPU 201 reads the recovery period stored in the main system DRAM 106 in the above step S1110. The CPU 201 uses an internal timer (not shown) to measure an elapsed time after processing initiation of step S1303 (after start of the processing for recovery to the operational state), and determines whether the elapsed time exceeds that recovery period. If the result of the determination is that it does exceed the recovery period, the processing proceeds to step S1309, and if it does not exceed it the processing waits in step S1305.

<Step S1306>

Upon receiving the recovery instruction from the main system 101 via the main system IF unit 304, the CPU 301 of the sub-system 102 side instructs power supply activation to the internal power supply control unit 307. The internal power supply control unit 307, which has received the power supply activation instruction, supplies a power supply to all components of the sub-system 102.

<Step S1307>

The CPU 301 reads the "power state of the sub-system 102 in the power saving state" stored in the sub-system DRAM 107 in step S1112. If the read "power state of the sub-system 102 in the power saving state" is the all power supply on state, the processing advances as is without anything being performed, and if the read "power state of the sub-system 102 in the power saving state" is either of the NW response state and the operation stop state, the processing proceeds to step S1308.

<Step S1308>

The CPU 301 reads the setting information stored in the sub-system DRAM 107 in step S1111, i.e. the setting information of the components in the sub-system 102 for which power supply is disconnected in the power state read in step S1307, and uses the setting information to reset the components in the sub-system 102 for which power supply is disconnected in the power state read in step S1307.

<Step S1309>

The CPU 201 of the main system 101 side starts access to the sub-system 102 via the sub-system IF unit 207, and performs recovery processing.

In this way, by virtue of the present embodiment, recovery from the power saving state to the operational state can be achieved in accordance with an interrupt notification from the sub-system 102 to the main system 101. In addition, in accordance with a power state of the sub-system 102 in the power saving state, it is possible to assume a power state for which resetting is unnecessary.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-009795, filed Jan. 21, 2015, and 2015-244396, filed Dec. 15, 2015, which are hereby incorporated by reference herein in their entirety.

What is claimed is:

1. An information processing apparatus comprising a main device, a first sub-device communicably connected to the main device, and a second sub-device communicably connected to the main device, wherein:
    the first sub-device determines a power state to which the first sub-device shifts, notifies the main device of a first time period corresponding to the determined power state and shifts to the determined power state,
    the second sub-device notifies the main device of a second time period, and
    wherein the main device determines a power state to which the main device shifts based on the first time period notified from the first sub-device and the second time period notified from the second sub-device, and shifts to the power state determined by the main device.

2. The information processing apparatus according to claim 1, wherein the first sub-device, in accordance with receiving an instruction from the main device, determines the power state to which the first sub-device shifts, notifies the main device of the first time period corresponding to the determined power state, and shifts to the determined power state.

3. The information processing apparatus according to claim 1, wherein the main device has a PCIe (Peripheral Component Interconnect Express) interface for communicating with the first and second sub-devices and each of the first and second sub-devices has a PCIe (Peripheral Component Interconnect Express) interface for communicating with the main device, and the main device is a root complex and each of the first and second sub-devices is an end point.

4. The information processing apparatus according to claim 1, wherein the main device determines the power state to which the main device shifts based on the shortest time period of the first time period notified from the first sub-device and the second time period notified from the second sub-device and shifts to the power state determined by the main device.

5. The information processing apparatus according to claim 1, wherein the main device shifts to the power state from an operational state in which power consumption is higher than power consumption in the power state.

6. The information processing apparatus according to claim 1, further comprising a printer which prints an image on a sheet.

7. An information processing apparatus comprising a main device, a first sub-device communicably connected to the main device, and a second sub-device communicably connected to the main device, wherein:
the first sub-device is able to shift to a first power state and a second power state, and to notify the main device of a first time period corresponding to the first power state and a second time period corresponding to the second power state,
the second sub-device notifies the main device of a third time period, and
the main device determines a power state to be shifted to based on the first time period or the second time period notified from the first sub-device and the third time period notified from the second sub-device, and shifts to the determined power state.

8. The information processing apparatus according to claim 7, wherein the first sub-device, in accordance with receiving an instruction from the main device, determines the first or second power state as a power state to which the first sub-device shifts, notifies the main device of the first or second time period, and shifts to the determined power state.

9. The information processing apparatus according to claim 7, wherein the main device has a PCIe (Peripheral Component Interconnect Express) interface for communicating with the first and second sub-devices and each of the first and second sub-devices has a PCIe (Peripheral Component Interconnect Express) interface for communicating with the main device, and the main device is a root complex and each of the first and second sub-devices is an end point.

10. The information processing apparatus according to claim 7, wherein the main device determines the power state to which the main device shifts based on the shortest time period of the first or second time period notified from the first sub-device and the third time period notified from the second sub-device, and shifts to the power state determined by the main device.

11. The information processing apparatus according to claim 7, wherein the main device shifts to the power state from an operational state in which power consumption is higher than power consumption in the power state.

12. The information processing apparatus according to claim 7, further comprising a printer which prints an image on a sheet.

13. An information processing apparatus comprising a main device, a first sub-device communicably connected to the main device, and a second sub-device communicably connected to the main device, wherein:
the first sub-device notifies the main device of a first time period,
the second sub-device notifies the main device of a second time period, and
the main device determines a power state to be shifted to based on the shortest time period of the first time period notified from the first sub-device and the second time period notified from the second sub-device, and shifts to the determined power state.

14. The information processing apparatus according to claim 13, wherein the first sub-device, in accordance with receiving an instruction from the main device, determines a power state to which the first sub-device shifts, notifies the main device of the first time period corresponding to the determined power state, and shifts to the determined power state.

15. The information processing apparatus according to claim 13, wherein the main device has a PCIe (Peripheral Component Interconnect Express) interface for communicating with the first sub-device and the second sub-device and each of the first and second sub-devices has a PCIe (Peripheral Component Interconnect Express) interface for communicating with the main device, and wherein the main device is a root complex and each of the first and second sub-devices is an end point.

16. The information processing apparatus according to claim 13, wherein the main device shifts to the power state from an operational state in which power consumption is higher than power consumption in the power state.

17. The information processing apparatus according to claim 13, further comprising a printer which prints an image on a sheet.

* * * * *